United States Patent [19]
Gärdin et al.

[11] Patent Number: 5,765,465
[45] Date of Patent: Jun. 16, 1998

[54] HIGH PRESSURE PRESS AND METHOD FOR HIGH PRESSURE TREATMENT OF SUBSTANCES

[75] Inventors: Mats Gärdin; Carl Bergman, both of Västerås, Sweden

[73] Assignee: Asea Brown Boveri AB, Västerås, Sweden

[21] Appl. No.: 687,482

[22] PCT Filed: Feb. 14, 1995

[86] PCT No.: PCT/SE95/00153

§ 371 Date: Sep. 5, 1996

§ 102(e) Date: Sep. 5, 1996

[87] PCT Pub. No.: WO95/21690

PCT Pub. Date: Aug. 17, 1995

[30] Foreign Application Priority Data

Feb. 14, 1994 [SE] Sweden ................................ 9400498

[51] Int. Cl.[6] ................................................ F01B 31/00
[52] U.S. Cl. ...................... 92/86; 92/169.1; 92/169.2; 92/171.1; 100/245
[58] Field of Search .................. 92/86, 169.1, 169.2, 92/171.1; 100/245

[56] References Cited

U.S. PATENT DOCUMENTS

| | | |
|---|---|---|
| 2,312,420 | 3/1943 | Kopf et al. . |
| 3,365,786 | 1/1968 | Takemura et al. . |
| 3,488,160 | 1/1970 | Noel . |
| 3,640,186 | 2/1972 | Lundstrom ........................ 92/169.1 |
| 4,093,100 | 6/1978 | Ford et al. . |
| 4,252,244 | 2/1981 | Christian et al. . |
| 4,685,384 | 8/1987 | Dirkin et al. ...................... 91/169.1 |
| 4,802,404 | 2/1989 | Dirkin et al. ...................... 92/169.1 |
| 5,370,043 | 12/1994 | Traff et al. ............................ 99/467 |
| 5,579,682 | 12/1996 | Bergman et al. ....................... 99/473 |

FOREIGN PATENT DOCUMENTS

| | | |
|---|---|---|
| A 60-172744 | 9/1985 | Japan . |
| 1 514 606 | 6/1978 | United Kingdom . |

*Primary Examiner*—Thomas E. Denion
*Attorney, Agent, or Firm*—Burns, Doane, Swecker & Mathis, L.L.P.

[57] ABSTRACT

A high-pressure and a method for high-pressure treatment of substances. The high-pressure press comprises a high-pressure cylinder consisting of a number of concentrically arranged cylinder elements (1, 2, 3). The cylinder elements (1, 2, 3) are radially prestressed to a predetermined prestress and surround a high-pressure chamber (6) for accommodating a pressurized medium. A thin safety liner (3), which is intended to be placed in the high-pressure cylinder until a fracture arises on the safety liner (3), is arranged in the interior of the high-pressure cylinder. Further, means (14, 15) are provided to conduct at least part of the pressurized medium from the high-pressure chamber (6) when a fracture arises on the safety liner (3). The means (14, 15) comprise at least one channel (14) running essentially along the outer envelope surface of the safety liner (3). The method comprises using the high-pressure press without liner replacement until a fracture has occurred on the thin safety liner.

18 Claims, 2 Drawing Sheets

HIGH PRESSURE PRESS AND METHOD FOR HIGH PRESSURE TREATMENT OF SUBSTANCES

FIELD OF THE INVENTION

The present invention relates to a high-pressure press for high-pressure treatment of substances, for example foodstuffs, pharmaceutical and cosmetic preparations, comprising a high-pressure cylinder consisting of a number of concentrically arranged cylinder elements which are radially prestressed to a predetermined prestress and which surround a high-pressure chamber for taking up a pressurized medium. The invention also relates to a method for high-pressure treatment of substances.

BACKGROUND OF THE INVENTION

For some time now, high-pressure treatment has been used as a method for, inter alia, inactivating microorganisms and certain enzymes in foodstuffs and other provisions. The advantage of high-pressure treatment as compared with the more frequently used heat-treatment method is that the microorganisms and the degrading enzymes in the foodstuff are killed without destroying vitamins and flavouring. During heat-treatment, on the other hand, the taste and the vitamin contents are changed, which requires additives in order to restore, as far as possible, the nutritive value and taste of the substance.

During high-pressure treatment of, for example, provisions, a high-pressure press is used. According to the state of the art, this consists of a number of concentrically arranged cylinder elements. The individual cylinder elements may be cylindrical or conical, thus together and concentrically arranged forming the high-pressure cylinder. The first outer cylinder element is usually of high-tensile steel and may be prestressed by means of a plurality of layers of steel wire wound around the cylinder element. Further, one or more second cylinder elements and an inner liner are pressed concentrically into the outer cylinder element. Also these second cylinder elements and the liner are radially prestressed to a predetermined prestress.

Further, the inner liner together with one or two end members and a high-pressure piston projecting into the inner liner delimit a high-pressure chamber. During high-pressure treatment of substances, the substance is moved into the high-pressure chamber, whereupon the high pressure is applied by pushing the high-pressure piston into the high-pressure chamber. In this connection, the high-pressure piston may either act directly on the substance, or on another pressure medium which transmits the pressure to the substance. The substance is then usually enclosed in a flexible package inside the high-pressure chamber.

A decisive factor for obtaining a good result during the high-pressure treatment is that a sufficiently high pressure is applied. During treatment of provisions, the pressure is usually set at around 1,000–15,000 bar. At these high pressures, the inner liner is subjected to very great stresses. Although the inner liner, when being mounted, has the highest possible surface fineness, cracks occur which may perhaps not be detectable. Although the inner liner has full radial prestress, these cracks will expand under the influence of the high pressure and the cyclic pressure variations. After a certain time in operation, some cracks will reach a critical crack length, causing the inner liner to crack momentarily along a substantially radial plane and to be divided into two parts.

Since liner failure of the above-mentioned kind unavoidably arises after some time in operation, the inner liner is usually made as a replaceable wear liner. To avoid liner failure, the wear liner is regularly replaced well in advance of the estimated service life. This means that the liners cannot be used for their full actual life. Since the liners are expensive, this, of course, means an economic disadvantage. Further, each liner replacement constitutes a time-consuming and costly process. The more often this process has to be carried out, the higher, of course, will be the total cost of the high-pressure treatment.

Although the wear liner is replaced for preventive purposes, it has, in addition, proved that about 10% of the wear liners are subjected to breakdowns within the calculated safety margin with regard to the number of work cycles. When the wear liner cracks into two parts, the high pressure in the high-pressure chamber will act on the fractured surfaces of the liner parts. This results in axial forces acting on the liner parts. These axial forces are proportional to the pressure in the high-pressure chamber and to the area of the fractured surfaces. Since the liner fractures occur in a substantially radial plane this area is proportional to the diameter and the wall thickness of the wear liner. At the high pressures prevailing during high-pressure treatment of, for example, provisions, the liner parts are thus subjected to very great axial forces. The axial press frame of the high-pressure press must, therefore, for safety reasons be dimensioned to be able to take up these very great forces. Under-dimensioning of the press frame would entail danger to the lives of the personnel in the immediate surroundings, since the axial forces could eject the liner parts and other members through the high-pressure press at a very, high speed. If the press frame is correctly dimensioned, the force from one liner part may be taken up directly by the end member fixed against the liner by the press frame. The other liner part, on the other hand, has in certain embodiments free axial space within which to move towards the other end of the high-pressure press. In case of a liner fracture, therefore, this detached other liner part may, in these embodiments, be accelerated towards the other end of the high-pressure press. Because of the great kinetic energy contained in the detached liner part, it may cause great damage to the inner parts of the high-pressure press before it is braked by the press frame. To minimize this damage, proposals have been made to arrange internal members for taking up the axial force from the detached liner part. These members are arranged in the immediate vicinity of that end of the liner which does not rest, via the end member, against the press frame. Thus, these members prevent the detached liner part from being accelerated inside the high-pressure press.

According to the current prior art described above, the press frame and the inner force-absorbing members must thus, for safety reasons, be dimensioned for the axial forces arising in case of a liner fracture. As an example of this it may be mentioned that the press frame of an ordinary high-pressure press for industrial operation may weigh between 40 and 80 tons. The safety dimensioning of the press frame and other force-absorbing members entails considerable costs, with regard to manufacture, transport, and installation as well as the handling and servicing of the high-pressure press. All of these costs contribute to make high-pressure treatment of substances expensive.

SUMMARY OF THE INVENTION

The object of the present invention is, therefore, a high-pressure press for high-pressure treatment of substances, and a method for such high-pressure treatment, which permits the innermost liner to be utilized during its full actual life and the safety dimensioning of the press frame and other force-absorbing members to be considerably reduced.

The above-mentioned object is achieved according to the invention with a high-pressure press of the kind described in the introductor, part of this description, which is characterized by an inner safety, liner which has a small wall thickness and which is designed to be placed in the high-pressure cylinder until a fracture occurs on the safety liner, and by means which are adapted to conduct at least part of the pressurized medium from the high-pressure chamber when a fracture occurs on the safety, liner and which comprise one or more channels extending essentially along the outer envelope surface of the safety liner.

Since the wall thickness of the safety, liner is small, the axial forces acting on the liner parts, after a liner fracture, are small. These axial forces are proportional to the pressure-absorbing annular area of the fractured surfaces of the liner parts. The wall thickness of the safety liner is chosen so small in relation to the maximum pressure in the high-pressure chamber that the axial forces cannot cause any damage to the high-pressure press, even if the press frame and other force-absorbing members are relatively weakly dimensioned.

If the safety liner is sufficiently thin, it may happen that the axial forces are not capable of overcoming the frictional forces acting between the safety liner and the cylinder element arranged immediately outside this liner. The result is then that the detached liner part does not move axially at all. This means that it may be difficult or impossible to discover outside the high-pressure press that a liner fracture has occurred. If the high-pressure press is driven on with a fractured inner liner, the pressurized medium in the high-pressure chamber may penetrate into the liner crack. This will cause that cylinder element which is arranged immediately outside the inner liner to be directly subjected to the high pressure. There is then a risk that a crack occurs also in this cylinder element, and that the crack leads to a fracture of this cylinder element too. Such a fracture may be devastating since the cylinder element is considerably thicker than the inner liner and since the high-pressure press in general is not dimensioned to take up the forces from such a fracture.

The means which according to the invention are arranged in the high-pressure press eliminate the risk of a fracture on the safety liner not being detected. When the safety liner cracks, part of the pressurized medium is conducted via channels from the high-pressure chamber and further out of the high-pressure press. This means that part of the pressurized medium will leak out on the outside of the high-pressure press. The leakage is very easy to discover or detect, so a fracture on the safety liner man be discovered from the outside of the high-pressure press immediately after the occurrence of the fracture.

Since the safety liner is thin, a fracture thereon will not cause any serious damage to the high-pressure press. As the fracture is discovered immediately, this makes it possible to use a wear liner until failure occurs. In this way, costly preventive wear liner replacements are avoided while at the same time each safety liner may be utilized during its full actual service life. In addition, the invention permits the press frame and the force-absorbing members of the high-pressure press to be dimensioned only to take up the relatively small forces which arise upon a fracture on the thin wear liner. This results in a considerable reduction in weight and saving of costs for the high-pressure press compared with high-pressure presses according to the prior art.

The channels extending along the outer envelope surface of the safety liner may be formed of grooves provided in the outer envelope surface of the safety liner and cooperating with the inner wall of the cylinder element arranged immediately outside the safety liner. Since the channels are running essentially along the envelope surface of the safety liner, the risk that the pressure supported by the pressurized medium should damage the cylinder elements arranged outside the safety liner, when the medium leaks out of the high-pressure chamber, is minimized. If, for example, some part of the channels should run radially out through the different cylinder elements, the strength of the high-pressure cylinder would be drastically reduced to an unacceptably low level. The fact that the channels are formed from grooves provided in the outer envelope surface of the safety liner further reduces the risk of the cylinder elements outside the safety liner being damaged in case of a fracture on the safety liner. At the same time, this embodiment of the channels makes it possible for the cylinder element arranged immediately outside the safety liner to be formed with a smooth inner surface without irregularities, which irregularities could otherwise constitute notches. In addition, the embodiment entails advantages in certain manufacturing processes, since it is generally easier to provide the grooves on an external cylinder surface than on an internal surface.

Further, the channels may be formed from grooves which are provided in the cylinder element arranged immediately outside the safety liner and which cooperate with the outer envelope surface of the safety liner. This embodiment permits, inter alia, an advantage from the manufacturing point of view if the safety liner is made very thin. The reason is that it is simpler to provide the grooves on a cylinder element with a relatively large wall thickness than on a very thin element. Further, it is possible that the channels consist of grooves provided both in the safety liner and in that cylinder element which is arranged immediately outside the safety liner.

The channels may further be arranged so as to run in the form of a spiral around the safety liner and essentially along the Whole length of the safety liner. The spiral shape is then advantageously chosen with a small pitch, that is, such that the longitudinal direction of the channels exhibits a small angle in relation to the radial cross-section plane of the liner. This results in the advantage that the grooves forming the channels and being provided in the safety liner, or in the cylinder element immediately outside thereof, only constitute a small weakening of the respective cylinder element in the critical direction of radial prestress. The notch effect of the grooves on the cylinder element decreases as the angle to the radial cross-section plane decreases. At the same time, it is guaranteed that the fracture on the safety line occurs across a channel and thereby that at least part of the pressurized medium leaks out in case of a fracture.

The channels may also consist of spaces between spacing members which are axially or helically arranged around the safety liner, between this and the cylinder element arranged immediately outside thereof, along essentially the whole length of the safety liner. This embodiment above all permits a simple and relatively inexpensive manufacture of the safety liner and of the cylinder element located immediately outside thereof. The embodiment also permits a relatively large cross section of the channels, without having an adverse effect on the strength of the high-pressure cylinder.

The invention also relates to a method for high-pressure treatment of substances, for example food, pharmaceuticals and cosmetic preparations in a high-pressure press, wherein the substance is treated in a high-pressure chamber which is surrounded by a high-pressure cylinder consisting of a number of concentrically arranged cylinder elements which are radially prestressed to a predetermined prestress and which are subjected to wear during the treatment, whereby at least the innermost cylinder element is replaced after some wear. The method is characterized in that the high-pressure press is used without liner replacement until a fracture has occurred on the innermost cylinder element which consists of a thin safety liner.

Since a fracture on the thin safety liner does not entail a risk of damage to the high-pressure press or its surroundings, the method entails a considerable saving of costs as each safety liner may be used during its full actual life.

In the method according to the invention, a fracture on the safety liner may be indicated by leading at least part of the substance or of a second pressure-absorbing medium, provided in the high-pressure chamber, out of the high-pressure cylinder when a fracture has occurred on the safety liner. This makes it possible to immediately detect that the safety liner has broken down and the high-pressure treatment can be interrupted to prevent damage from arising on the cylinder elements which are arranged outside the safety liner.

BRIEF DESCRIPTION OF THE DRAWING FIGURES

A preferred embodiment of the high-pressure press and the method according to the invention will be described in the following with reference to the accompanying drawings.

DETAILED DESCRIPTION OF PREFERRED EMBODIMENT

Figure 1:
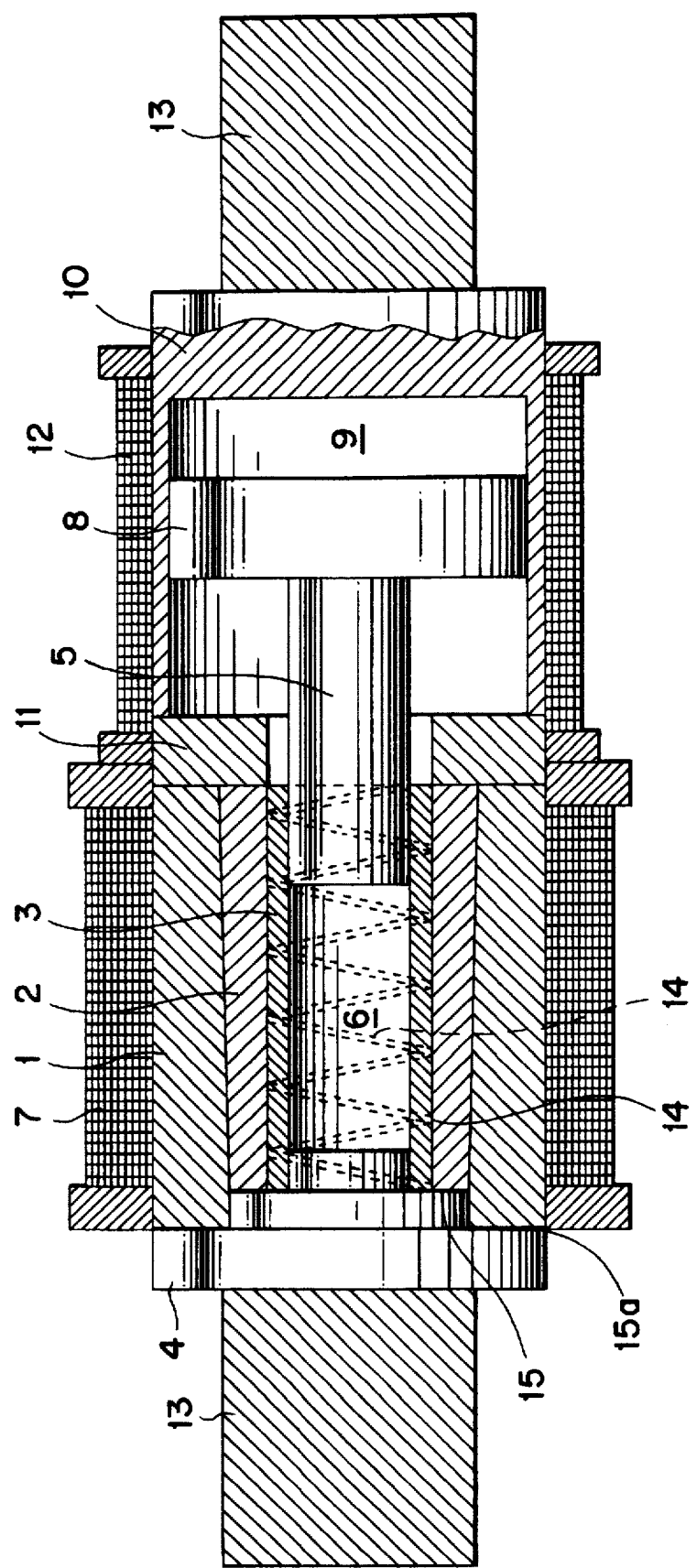
FIG. 1 is a schematic longitudinal section through a preferred embodiment of a high-pressure press according to the invention.

The embodiment of the high-pressure press according to the invention and shown in FIG. 1 comprises a first outer cylinder element 1, in which a second cylinder element constituting a supporting liner 2 and a safety liner 3 are arranged. These elements form a high-pressure cylinder 1, 2, 3. An end member 4 is arranged at one end of the high-pressure cylinder. Further, a high-pressure piston 5 is displaceably arranged for insertion into the safety liner 3. The safety liner 3, the end member 4 and the high-pressure piston 5 thus define a high-pressure chamber 6 to accommodate the substance to be treated. The high-pressure cylinder 1, 2, 3 is radially prestressed by means of a first wire winding 7 of steel wire. In this connection, the predetermined prestress of the safety liner 3 is chosen such that the tensile stress, which arises in the safety liner when the high-pressure chamber 6 is pressurized to the full pressure, equalizes the compressive stress in the safety liner which is accomplished through the radial prestressing.

Further, the high-pressure piston 5 is fixed to a low-pressure piston 8, which has a larger area than the high-pressure piston 5 and which is displaceably arranged in a low-pressure chamber 9. This low-pressure chamber 9 is formed from a low-pressure chamber element 10 and a low-pressure chamber end plate 11. Also the low-pressure chamber element 10 is radially prestressed by means of a second wire winding 12. Axially around the high-pressure press, a press frame 13 is arranged to take up the axial forces. Further, high-pressure seals (not shown) are provided in a known manner at the end member 4 and the high-pressure piston 5.

During high-pressure treatment of a substance, this substance is moved into the high-pressure chamber 6. Thereafter, a certain pressure is supplied to the low-pressure chamber 9 by means of hydraulics. The pressure presses the low-pressure piston 8 against, and the high-pressure piston 5 into, the high-pressure chamber and results in a higher pressure inside the high-pressure chamber 6. The substance in the high-pressure chamber 6 is thus pressurized to a certain pressure and is maintained at this pressure for a certain period of time. Normal pressures for the high-pressure treatment of provisions lie between 1,000 and 15,000 bar. After the predetermined holding time has been attained, the substance is decompressed by moving the high- and low-pressure pistons 5, 8 to the right in the figure. Thereafter, the treated substance is moved out of the high-pressure chamber 6. Instead of allowing the high-pressure piston 5 to act directly on the substance, it is also possible to allow the substance to be enclosed in a flexible container (not shown), which is placed in the high-pressure chamber 6. The high-pressure piston 5 is then allowed to act on a separate pressure medium in the high-pressure chamber, this pressure medium in turn acting on the substance in the flexible container. What is described above is within the scope of the prior art.

Figure 2:
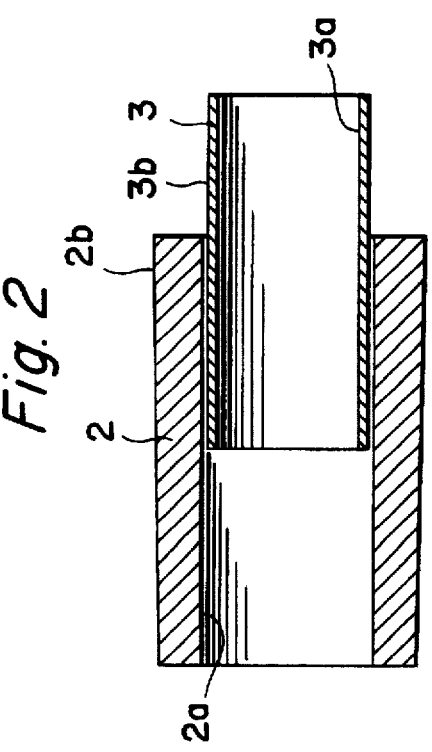
FIG. 2 is a schematic longitudinal section through a safety liner and a cylinder element arranged immediately outside the safety liner, the safety liner not being fully inserted.

FIG. 2 (reference is also made below to FIG. 1) shows the thin safety liner 3 when being inserted into the supporting liner 2. The supporting liner 2, which is located outside the other cylinder elements 1 and which at this stage is not prestressed, has a cylindrical inner side 2a and a conical outer side 2b. The inner and outer sides 3a, 3b of the safety liner 3 are cylindrical. Further, the wall thickness of the safety liner 3 is chosen to be as thin as possible from the point of view of manufacturing technique. In the normal case, the wall thickness of the safety liner 3 of a small-sized laboratory press may be between 2 and 6 mm, whereas the corresponding wall thickness of a larged-sized production press may be between 5 and 20 mm. Alteratively, the wall thickness of the safety liner 3 may be larger when the safety liner is being inserted into the supporting liner 2. After the insertion, the inner side 3a of the safety liner 3 is then machined so as to obtain a suitable wall thickness. In this way still thinner wall thicknesses than those mentioned above may be obtained.

The external diameter of the safety liner 3 corresponds to the internal diameter of the supporting liner 2, thus creating a so-called zero fit when the safety liner 3 is inserted into the supporting liner 2. This makes it possible to insert the thin safety liner 3 (from the right in the figure) without any significant friction arising between the inner side 2a of the supporting liner 2 and the outer side 3a of the safety liner 3. Thus, the insertion can be made without any risk of the safety liner 3 being folded or otherwise damaged when being inserted. Thus, after the insertion a unit is obtained consisting of a supporting liner 2 with a safety liner 3 in which neither the supporting liner nor the safety liner 2, 3 are radially prestressed.

Figure 4:
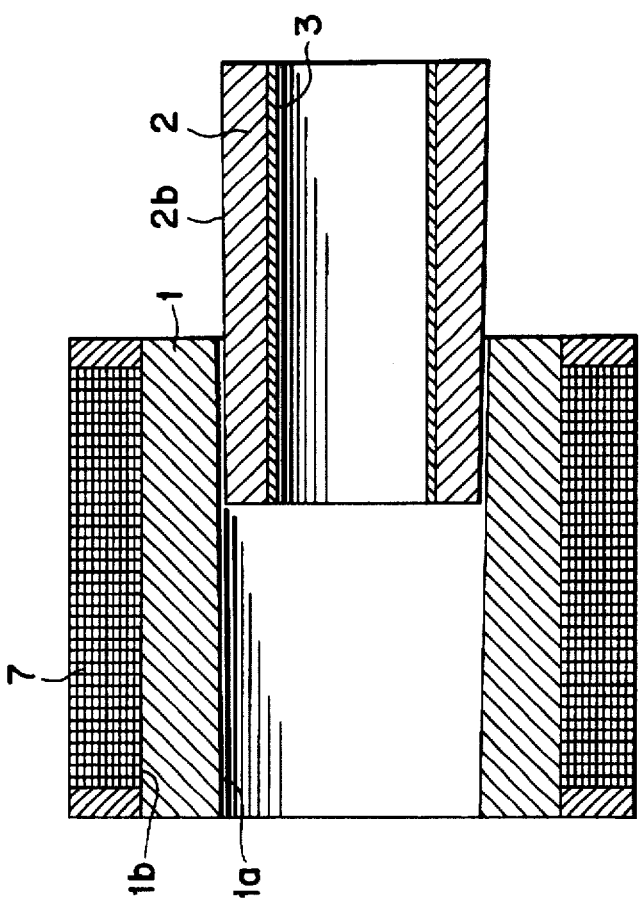
FIG. 4 is a schematic longitudinal section through a high-pressure cylinder according to the invention, wherein the safety liner and the cylinder element arranged immediately outside thereof are not fully inserted into the outermost cylinder element.

FIG. 4 shows how the above-mentioned unit is inserted into the outer cylinder element 1 of the high-pressure press. The inner side 1a of the outer cylinder element 1 is conical with a conicity, corresponding to the conicity of the outer side 2b of the supporting liner 2. Further, the cylinder element 1 is radially to a certain calculated prestress by means of the wire winding 7 on the outer side of the cylinder element 1. The supporting liner 2 with the safety liner 3 is inserted into the cylinder element 1 (from the right in the figure) by being first pushed in until the conical outside 2b of the supporting liner 2 makes contact with the equally conical inside 1a of the cylinder element 1. Thereafter, the supporting liner 2 with the safety liner 3 is pressed the remaining distance to the left. During this inward pressing movement, a radial prestress still be imparted to the supporting liner 2 and hence to the safety liner 3. By having chosen the prestress of the cylinder element 1 at a certain value, it is possible to obtain the final predetermined prestress value of the inner safety liner 3 when the supporting liner 2 is pressed a suitable distance into the cylinder element 1.

Figure 3:
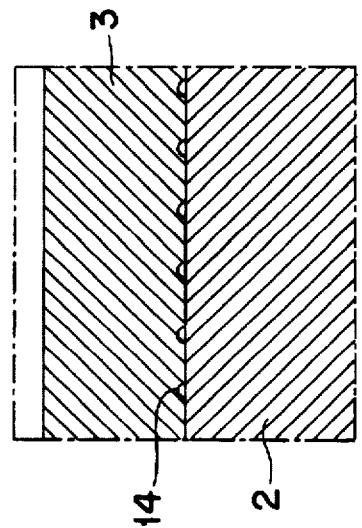
FIG. 3 is a partial enlargement of the longitudinal section in FIG. 2.

Again referring to FIG. 1 (see also FIG. 3), a high-pressure press according to the invention will be described in more detail in the following. The high-pressure press shown in the figure comprises a high-pressure cylinder which consists of three concentrically arranged cylinder elements 1, 2, 3. The innermost cylinder element consists of a thin safety liner 3. The wall thickness of the safety liner 3 is dimensioned in relation to a number of parameters, among other things, the maximum pressure prevailing in the high-pressure chamber 6 and the diameter and length of the safety liner 3. If a fracture occurs on the safety liner 3, the pressure supported by the pressure-absorbing medium in the high-pressure chamber 6 will act on the fractured surfaces of the safety liner 3. Since the fracture occurs along an essentially radial plane, these fractured surfaces will be annular. When the pressure acts on the fractured surfaces, axial forces arise which act on the liner parts in a direction away from the location of the fracture. The magnitude of these axial forces is proportional to the pressure in the high-pressure chamber 6 and to the annular area of the fractured surfaces. The annular area, in turn, is proportional to the diameter and the wall thickness of the safety liner. To ensure that the safety liner can be used until it is damaged, its wall thickness is therefore dimensioned so small that the above-mentioned axial forces, upon a fracture on the safety liner, are not able to accelerate any of the liner parts to speeds which may be harmful to the high-pressure press or its surroundings. In practice, the wall thickness of the safety liner may be chosen to be as small as is possible from the point of view of manufacturing technique.

Further, the high-pressure press is provided with means 14, 15 intended, in case of a fracture on the safety, liner 3, to conduct at least part of the medium, pressurized in the high-pressure chamber 6, out of the high-pressure chamber 6. One part 14 of these means 14, 15 is arranged between the safety liner 3 and the supporting liner 2. This part 14 consists of grooves provided on the outer side 3b of the safety liner 3 and cooperating with the inner side 2a of the supporting liner 2, while forming a channel 14. This channel 14 communicates within a gap 15 between the end member 4 of the high-pressure chamber 6 and the cylinder elements 1, 2 arranged outside the safety, liner 3. This gap 15 has an outer orifice 15a which is arranged outside the high-pressure press. Further, the channel 14 runs in the form of a spiral along the whole length of the safety liner 3. Normally, the groove is from a few tens of a millimeter to some few millimeters wide and deep.

When the safety liner 3 cracks, the pressure which is supported by the pressure-absorbing medium in the high-pressure chamber 6 will act on the fractured surfaces of the safety liner 3. Since the area of the fractured surfaces is small, the axial forces acting on the liner parts are not capable of accelerating these parts such that they can damage the high-pressure press internally. This makes it possible, without any risk of damage or extra expenses, to utilize each safety liner during its full actual life.

If the wall thickness of the safety liner 3 has been chosen to be sufficiently small, the axial forces in case of a fracture are so small that they can hardly, or not at all, overcome the frictional forces acting between the safety liner 3 and the cylinder element 2 arranged immediately outside thereof. This leads to the liner parts not being moved at all or being moved only a small distance. To prevent the high-pressure press, in such a case, from being inadvertently driven on with a risk of cracks arising in the cylinder element arranged outside the safety liner, the channel 14 and the gap 15 are adapted to move part of the pressurized medium out to the outside of the press.

When the safety liner 3 cracks, the crack will intersect the channel 14. Because of the high pressure in the high-pressure chamber 6, part of the pressurized medium is then pressed out into the channel 14 and further out via the gap 15 and the orifice 15a of the gap, where it leaks out outside the high-pressure press. This thus affords a rapid and reliable indication that the safety liner 3 has been damaged, which enables the safety liner to be immediately replaced after a damage and minimizes the risk of the press being driven with a burst safety liner 3.

If the high-pressure piston 5 during operation acts directly on the substance being high-pressure treated, it is this substance that leaks out. On the other hand, if the high-pressure piston acts on another pressure medium, which in turn pressurizes the substance, this other medium leaks out. The risk of the pressurized medium, during operation, leaking out into the gap 15 is eliminated by the arrangement of a high-pressure seal (not shown) between the end member 4 of the high-pressure chamber and the inner side 3a of the safety liner 3.

The invention is nots of course, limited to the embodiments exemplified above, but can be modified in different ways within the scope of the appended claims.

For example, the safety liner may be arranged direct in the outermost cylinder element, without intermediate supporting liners or other cylinder elements. In that case, the outermost cylinder element is not fuller prestressed when the safety liner is inserted thereinto. The final predetermined prestress of the cylinder element and the safety liner is obtained, for example, by winding steel wire around the outer cylinder element after the safety liner has been inserted.

Further, it is possible for the means which are adapted, upon a liner fracture, to conduct the pressurized medium out from the high-pressure chamber to partly consist of several plane-parallel helical channels arranged between the safety liner and the cylinder element located immediately outside this liner.

The above-mentioned channels may also be formed from spaces between spacing members arranged between the safety liner and the cylinder element provided immediately outside thereof. The spacing members and hence the channels may in this case be, for example, axially or spirally arranged.

Further, it may be mentioned that the high-pressure chamber 6, which is radially defined by the innermost cylinder element 3, may be defined at its end by, for example, two end members, two pistons, or by end members and pistons in various combinations.

We claim:

1. A high-pressure press for high-pressure treatment of substances, comprising a high-pressure cylinder comprised of a plurality of concentrically arranged cylinder elements which are radially prestressed to a predetermined prestress and which surround a high-pressure chamber for accommodating a pressurized medium, the plurality of cylinder elements including an inner safety liner having an outer envelope surface, and including at least one channel adapted to conduct at least part of the pressurized medium from the high-pressure chamber when a fracture occurs on the safety liner, the at least one channel along the outer envelope surface of the safety liner in a spiral form with respect to the safety liners, said at least one channel extending along substantially the entire length of the safety liner.

2. A high-pressure press according to claim 1, wherein the at least one channel is formed as a groove provided in the outer envelope surface of the safety liner and cooperating with an inner wall of the cylinder element arranged immediately outside the safety liner.

3. A high-pressure press according to claim 1, wherein the at least one channel is formed as a groove provided in an inner wall of the cylinder element which is arranged immediately outside the safety liner, and which cooperate with the outer envelope surface of the safety liner.

4. A high-pressure press according to claim 1, wherein the at least one channel is formed from spaces between spacing members which are spirally arranged around the safety liner, the spacer members being located between the safety liner and the cylinder element arranged immediately outside the safety liner.

5. A high pressure press according to claim 2, wherein the at least one channel is formed as a groove provided in an inner wall of the cylinder element which is arranged immediately outside the safety liner, and which cooperates with the outer envelope surface of that safety liner.

6. A high-pressure press according to claim 1, including a gap communicating the at least one channel with an exterior of the high pressure press for directing the high-pressure medium in the at least one channel exteriorly of the high-pressure press.

7. A method for high-pressure treatment of substances in a high-pressure press that includes a high-pressure chamber surrounded by a high-pressure cylinder comprised of a plurality of concentrically arranged cylinder elements which are radially prestressed and subjected to wear during high-pressure treatment, the plurality of cylinder elements including a safety liner, the method comprising:

placing a substance to be treated with high pressure in the high-pressure chamber;

pressurizing the substance in the high-pressure chamber through operation of the high-pressure press; and providing an indication of a fracture in the safety liner by directing a medium from the high-pressure chamber to at least one spiral channel which extends for substantially the entirety of the length of the safety liner and which is located between the safety liner and the cylinder element located immediately adjacent the safety liner.

8. A method according to claim 7, wherein said medium is the subsuce in the high-pressure chamber.

9. A method according to claim 7, wherein said medium is a pressure medium in the high-pressure chamber other than said substance.

10. A method according to claim 7, wherein said step of providing an indication of a fracture in the safety liner includes directing a medium from the high-pressure chamber through a groove that extends in a spiral manner along the length of the safety liner.

11. A method according to claim 7, wherein said step of providing an indication of a fracture in the safety liner includes directing a medium from the high-pressure chamber through a spiral groove formed in an outer peripheral surface of the safety liner.

12. A method according to claim 7, wherein said step of providing an indication of a fracture in the safety liner includes directing a medium from the high-pressure chamber through a spiral groove formed in an inner surface of the cylinder element located immediately adjacent the safety liner.

13. A method according to claim 7, wherein said step of providing an indication of a fracture in the safety liner includes directing a medium from the high-pressure chamber through a spiral groove formed by spirally arranged spacer members positioned between the safety liner and the cylinder element located immediately adjacent the safety liner.

14. A high-pressure press for high-pressure treatment of substances, comprising a plurality of concentrically arranged and radially prestressed cylinder elements defining a high-pressure cylinder, the plurality of concentrically arranged cylinder elements including a safety liner and a supporting liner located outwardly of and in surrounding relation to the safety liner, the safety liner having an outer peripheral surface and the supporting liner having an inner surface, the outer peripheral surface of the safety liner facing the inner surface of the supporting liner, a high-pressure piston positioned within the safety liner for pressurizing a substance through movement of the high-pressure piston, an end member positioned at one end of the high-pressure cylinder to define with the safety liner and the piston a high-pressure chamber for receiving a substance to be pressurized through movement of the piston, at least one channel disposed between the outer peripheral surface of the safety liner and the inner surface of the supporting liner for conducting pressurized medium from the high-pressure chamber upon the occurrence of a crack in the safety liner, the at least one channel extending along substantially the entire length of the safety liner, and a gap provided between the end member and at least the safety liner, the gap being in communication with the at least one channel to release the pressurized medium in the at least one channel outside the high-pressure press.

15. A high-pressure press according to claim 14, wherein the at least one channel is defined by a groove formed in the safety liner.

16. A high-pressure press according to claim 14, wherein the at least one channel is defined by a groove formed in the inner peripheral surface of the supporting liner.

17. A high-pressure press according to claim 14, wherein the at least one channel is defined by a spacer member positioned between the outer peripheral surface of the safety liner and the inner peripheral surface of the supporting liner.

18. A high-pressure press according to claim 14, wherein the at least one channel extends in a spiral manner with respect to the length of the safety liner.

* * * * *